No. 865,223. PATENTED SEPT. 3, 1907.
D. A. YORK & S. A. DARR.
VEHICLE AXLE.
APPLICATION FILED AUG. 15, 1906.
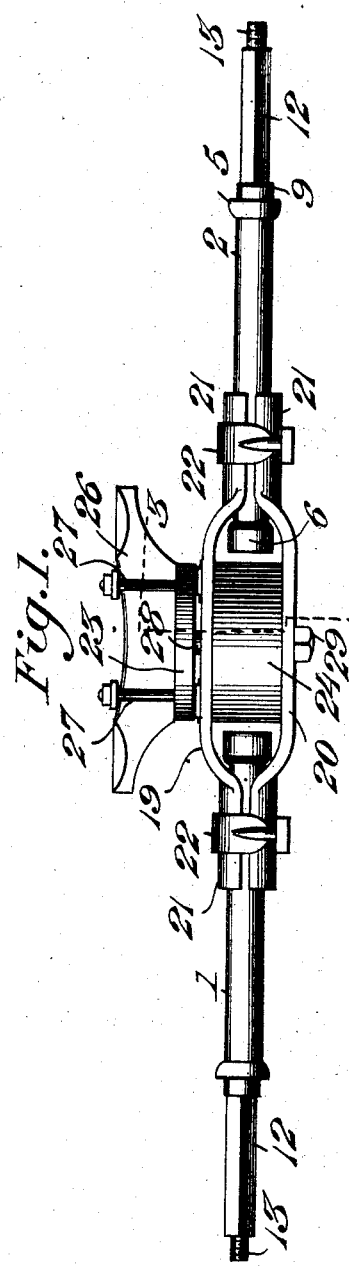
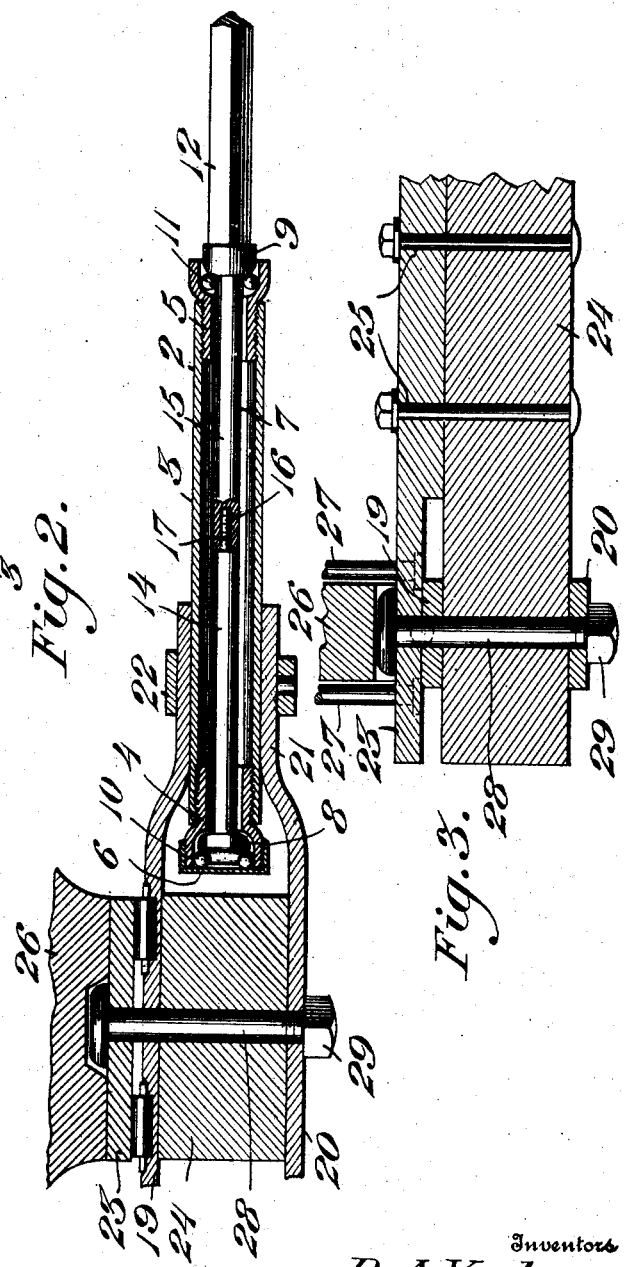
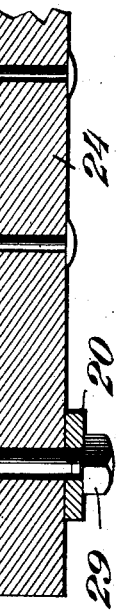
Witnesses
Phil. E. Barnes
C. C. Hines
Inventors
D. A. York.
S. A. Darr.
By Victor J. Evans
Attorney

UNITED STATES PATENT OFFICE.

DOCTOR ALONZO YORK AND SAMUEL ALEXANDER DARR, OF MINEOLA, TEXAS.

VEHICLE-AXLE.

No. 865,223.      Specification of Letters Patent.      Patented Sept. 3, 1907.

Application filed August 15, 1906. Serial No. 330,760.

*To all whom it may concern:*

Be it known that we, DOCTOR ALONZO YORK and SAMUEL ALEXANDER DARR, citizens of the United States of America, residing at Mineola, in the county of Wood and State of Texas, have invented new and useful Improvements in Vehicle-Axles, of which the following is a specification.

This invention relates to improvements in axles for buggies and other vehicles, its object being to provide a simple and light-weight construction of axle which possesses the desirable qualities of being easy running, affording convenience of access to the parts for adjustment for wear and repairs, and of being readily applicable to existing types of vehicles, and which is, furthermore, strong and durable and not liable to easily get out of order.

In the accompanying drawings,—Figure 1 is a front elevation of an axle embodying my invention. Fig. 2 is a longitudinal section through a portion thereof on an enlarged scale. Fig. 3 is a cross section taken substantially on the line 3—3 of Fig. 1.

The axle comprises in its construction two longitudinally inclined sections 1 and 2, each comprising a bearing sleeve or casing 3, into the ends of which are threaded bearing cups 4 and 5, the inner cup 4 being provided with a threaded cap or closure 6. Extending through the casing and cups is a spindle 7 provided with bearing cones 8 and 9 which respectively turn within the cups 4 and 5, said cones and cups forming raceways for sets of bearing balls 10 and 11 on which the spindle is adapted to freely revolve. The cone 9 closes the outer side of the cup 5 to prevent access of dirt and other foreign substances thereto, while the cap or closure 6 performs a like service for the cup 4. The cone 8 is threaded or otherwise removably mounted on the spindle to permit of the ready application and removal of the latter. The spindle is provided at its outer end with an angular arm 12 adapted to fit within a correspondingly shaped box in the hub of the wheel which will, therefore, be fixed to the axle to turn therewith, the arm terminating at its outer end in a threaded stem 13 for the reception of a nut to hold the wheel in position thereon. As shown, the spindle 7 is preferably constructed in two sections 14 and 15, one having a threaded socket 16 to receive a reduced stem 17 on the other, whereby said sections are coupled together and may be relatively adjusted to move the cones 8 and 9 in and out for the purpose of adjusting them to take up any wear in the bearings. Where the sectional construction of the spindle is employed, both cones may be formed integrally on the axle, as such sectional construction will permit of the ready application and removal of the spindle in an obvious manner.

The axle sections 1 and 2 are coupled and carried by a yoke or connecting member 18 comprising upper and lower reversely bowed plates 19 and 20 terminating in cuff sections 21 embracing the inner ends of the casings 3, and rigidly fastened thereto by clips or other suitable couplings 22, thus holding the casings 3 from relative rotation and allowing the spindles solely to revolve therein. The upper plate 19 of the yoke or coupling device forms the lower member or movable circle plate of a fifth wheel, the upper member of which is formed by a plate 23 fastened to the reach 24 by suitable bolts 25 and to the bolster 26 by clips 27. A king bolt 28 passes through the forward end of the reach, the plates 19 and 20 of the yoke or coupling device and the plate 23, and thus pivotally connects the axle with the running gear of the vehicle. As shown, the head of the bolt rests upon the plate 23 and occupies a recess in the bottom of the bolster 26, while a nut 29 is applied to the lower end of the bolt to hold the parts assembled.

It will be seen from the foregoing description that the spindles 7 are free to have independent rotation in their respective casings 3, and are thus adapted to permit the wheels of the vehicle to rotate at different relative speeds. The construction of the bearings is such as to permit the spindles to rotate freely and with a minimum degree of friction, thus making the axle easy running. The parts are light in weight, thus providing an axle which possesses great strength and rigidity without excessive weight. The axle may, it is apparent, be applied to buggies and other vehicles of any ordinary type, and its construction is such as to permit ready and convenient access to the parts thereof for renewal or repairs.

Having thus described the invention, what is claimed as new is:

1. An axle comprising a pair of sections, each composed of a bearing sleeve and a spindle rotative therein, and a coupling connecting said sleeves and adapted for pivotal mounting upon a vehicle.

2. A vehicle axle comprising a pair of independent sections, each composed of a bearing sleeve and a spindle adapted to turn therein, and a coupling detachably connecting said sleeves, and adapted for pivotal mounting upon a vehicle.

3. A vehicle axle comprising a pair of independent sections, each section consisting of a bearing sleeve having a spindle revoluble therein, and a coupling connecting said sleeves, said coupling being constructed to form one member of a fifth wheel, whereby the device may be mounted on an ordinary vehicle.

4. A vehicle axle comprising a pair of independent sections, each comprising a bearing hub or sleeve having a spindle rotative therein, and a coupling member connecting said hubs or sleeves and having spaced plates forming a reach-receiving yoke, one forming a fifth wheel member, whereby the axle is adapted to be mounted upon a vehicle.

5. A vehicle axle comprising a pair of sections, each consisting of a hub or bearing sleeve having a spindle rotative therein, and a coupling connection between said sleeves adapted for connection with a reach and to form one member of a fifth wheel.

6. A vehicle axle comprising a pair of sections, each consisting of a hub or sleeve having a spindle rotative therein, and a sectional coupling connecting said sections, said coupling being adapted for connection with a reach and to form one member of a fifth wheel.

7. A vehicle axle comprising a pair of sections, each consisting of a hub or sleeve having a spindle rotative therein, a coupling comprising sections adapted for connection with the reach and to form one of the members of a fifth wheel, and means for detachably coupling said sections to the spindle hubs.

8. A vehicle axle comprising two sections, each consisting of a hub or sleeve provided with cups, spindles rotative therein and provided with cones, said cups and cones forming raceways, anti-friction bearings in said raceways, and a coupling connection between said sections adapted to form one member of a fifth wheel.

9. A vehicle axle comprising two sections, each consisting of a hub or sleeve provided with cups, a spindle revoluble therein and provided with cones, said cups and cones forming raceways, anti-friction bearings in said raceways, each spindle being formed of adjustably connected sections, and a coupling connection between the axle sections adapted to form one member of a fifth wheel.

In testimony whereof, we affix our signatures in presence of two witnesses.

DOCTOR ALONZO YORK.
SAMUEL ALEXANDER DARR.

Witnesses:
ARTHUR J. SOULÉ,
J. M. FOSTER.